(12) United States Patent
McLean et al.

(10) Patent No.: US 8,086,948 B2
(45) Date of Patent: Dec. 27, 2011

(54) FRAMEWORK FOR THE DYNAMIC GENERATION OF A SEARCH ENGINE SITEMAP XML FILE

(75) Inventors: John A. McLean, Greenbank (CA); Walfrey Ng, Markham (CA); Danny Yuan, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 11/737,563

(22) Filed: Apr. 19, 2007

(65) Prior Publication Data

US 2008/0263005 A1    Oct. 23, 2008

(51) Int. Cl.
*G06F 19/00* (2006.01)

(52) U.S. Cl. ........ 715/206; 707/706; 707/707; 707/709; 707/711; 715/205; 715/243

(58) Field of Classification Search .................... 715/206
See application file for complete search history.

(56) References Cited

U.S. PATENT DOCUMENTS

| | | | |
|---|---|---|---|
| 6,957,383 B1 | 10/2005 | Smith | |
| 7,133,870 B1 | 11/2006 | Tripp et al. | |
| 7,480,627 B1 * | 1/2009 | Van Horn et al. | 705/26.2 |
| 2003/0009392 A1 * | 1/2003 | Perkowski | 705/26 |
| 2004/0030683 A1 | 2/2004 | Evans et al. | |
| 2005/0131779 A1 * | 6/2005 | Kitamura et al. | 705/29 |
| 2005/0240492 A1 * | 10/2005 | Grdina | 705/26 |
| 2006/0041549 A1 | 2/2006 | Gundersen et al. | |
| 2006/0190448 A1 | 8/2006 | Bartek et al. | |
| 2007/0050338 A1 * | 3/2007 | Strohm et al. | 707/3 |
| 2010/0077098 A1 * | 3/2010 | Fox et al. | 709/233 |
| 2010/0306644 A1 * | 12/2010 | Underwood et al. | 715/234 |
| 2010/0318508 A1 * | 12/2010 | Brawer et al. | 707/709 |

OTHER PUBLICATIONS

"Dynamic Structuring of Web Information for Access Visualization", Mak et al., SAC 2002, Madrid, Spain, Copyright 2002 ACM 1-58113-445-2/02/03, pp. 778-784.
"Dynamic Range Software"; http://www.freedownloadmanager.org/downloads/dynamic_range_software/; retrieved Apr. 18, 2007; pp. 1-5.
"Unlimited Sitemap Generator"; http://www.XML-sitemaps.com/standalone-google-sitemap-generator.html; retrieved Apr. 18, 2007; pp. 1-4.
"XML Sitemap Maker", website: http://www.popularshareware.com/XML-Sitemap-Maker-download-40981.html; retrieved Apr. 18, 2007; pp. 1-2.
"SiteMap XML Dynamic SiteMap Generator 1.0"; http://www.softswot.com/sitemapinfo.php; retrieved Apr. 18, 2007; pp. 1-17.

* cited by examiner

*Primary Examiner* — Laurie Ries
*Assistant Examiner* — Zaida Marrero
(74) *Attorney, Agent, or Firm* — Cantor Colburn LLP; Jeanine Ray-Yarletts

(57) ABSTRACT

The present invention relates to a method for the generation of a Sitemap XML file. The method comprises retrieving input parameter values and determining at least one target entity (an online retail store) within a target environment (a retailer) for which a search engine sitemap definition page will be generated and rendering the sitemap definition page for the determined target entity. The rendered content being further evaluated and ordered according to predetermined priority algorithms. The method further comprises outputting the rendered sitemap definition page, where if the output sitemap definition page exceeds a predetermined size, the output sitemap definition page is divided into smaller segments and an index file is generated and associated with the segmented output sitemap definition page files. Caching functionality (to enhance operational performance) and access control functionality (for controlling the rendering of sitemaps) is further provided within aspects of the present invention.

6 Claims, 1 Drawing Sheet

FRAMEWORK FOR THE DYNAMIC GENERATION OF A SEARCH ENGINE SITEMAP XML FILE

BACKGROUND OF THE INVENTION

1. Field of the Invention

This invention relates to the field of Internet web site searching tools, and particularly to dynamically generating web search engine sitemap files.

2. Description of Background

Before our invention, in order for a search engine to index the web pages of an Internet retailer, a web spider would have to crawl through an entire website, indexing each web page that it discovered along the way. As a solution to such system intensive searching operations the Sitemap protocol has been developed. The Sitemap protocol allows a Webmaster for an Internet retailer to create a sitemap XML file that contains a list of URLs for the retailer's website. In practice, an Internet merchant can place an XML file on a server and thereafter submit the location of the XML file to a search engine. After being notified of the XML file, any web spider implemented by a search engine and supporting the Sitemap protocol can read the retailer's XML file and index all the URLs that are identified in the XML file.

Currently, Google™ has implemented an existing sitemap generator that generates a Sitemap XML file based on a list of provided URLs, the directory paths of a web server, and the access logs of a web server. However, the tool only converts the URL list into the XML format that conforms to the Sitemap XML schema. For generating a sitemap file based on a list of provided URLs, site developers still need to list all the URLs that they want the search engines to index, and this is extremely time consuming and error-prone. Also, it becomes almost impossible to list the URLs of the site that has thousands or millions of pages they want to index. Having large number of pages to index is very normal for Internet retailers who sell thousands or millions of products Further, the tool will check the HTML files in each directory path and create URL for each corresponding HTML file. However, this approach does not apply to dynamically generated pages through application server, and unfortunately, it is very common for Internet retailers to use application servers for the dynamic generation of web pages and to handle transactions. Also, the existing tool generates a sitemap file based upon the access logs of a web server. However, the drawback is that there is no guarantee that all of a website's URLs have been selected (clicked) by users and will be available in the access logs. Also, it cannot ensure that the generated sitemap contains only the pages that the retailers want to be indexed by the search engines. For example, shopping cart checkout pages typically should not indexed. Furthermore, the tool cannot provide additional sitemap information such as last modification, priority and the anticipated change frequency of the file.

Currently, there exists another tool that is configured to crawl through a sitemap XML file. However, the tool is very hard to control, thus making it difficult to ensure that a generated sitemap only contains the pages that a retailer wants to be indexed by a search engine. Similarly, the tool is not able to provide additional sitemap information such as the last modification, priority, and change frequency of a file. Additionally, large amounts of CPU resources are required to crawl through the entire site, especially in the case where there are millions of products and there are multiple stores hosted by a server. The internal web spiders will have no knowledge about when pages are created/updated and will always need to spend the CPU resources to crawl the entire site. All these are serious drawbacks to the Internet retailers, especially for those who have thousands or millions of products that they need to maintain.

Because of the drawbacks described above, there exist a need for a framework to dynamically generate Search Engine Sitemap XML files for Internet retailers that use application server to maintain their products and website pages.

SUMMARY OF THE INVENTION

The shortcomings of the prior art are overcome and additional advantages are provided through the provision of a method for the generation of sitemap using a sitemap definition page. The method comprising identifying a target environment, the target environment comprising a predetermined retailer, and retrieving input parameter values, wherein the input parameter values are determined by the target environment, the input parameter values further comprising information identifying at least one target entity, the target entity comprising an online retail store, and information associating a predetermined sitemap definition page with the particular target entity.

The method further comprises determining the at least one target entity within a target environment for which a search engine sitemap definition page will be located and rendering the sitemap definition page for the determined target entity, wherein the rendered sitemap definition page is further configured to retrieve predetermined classification of data in order to create rendered content within the rendered sitemap definition page, the rendered content being further evaluated and ordered according to predetermined priority algorithms. Yet further, the method comprises outputting the rendered sitemap definition page for the determined target entity into a predetermined file format, where in the event that the output sitemap definition page is determined to exceed a predetermined size, then the output sitemap definition page will be divided into smaller segments and an index file will be generated and associated with the segmented output sitemap definition page files. The rendered content is further evaluated and ordered according to the predetermined priority algorithms, which includes providing a higher uniform resource locator priority for a promotional product in which a promotional product's supplier offers an incentive to the predetermined retailer. The predetermined priority algorithms include providing a higher uniform resource locator priority for overstocked inventory that exceeds a certain threshold and providing a higher uniform resource locator priority for low inventory in an event the low inventory is below a certain threshold.

A computer program product corresponding to the above-summarized methods is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that results in assisting in conserving system resources and simplifying the search efforts of dispatched search engine web spiders.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
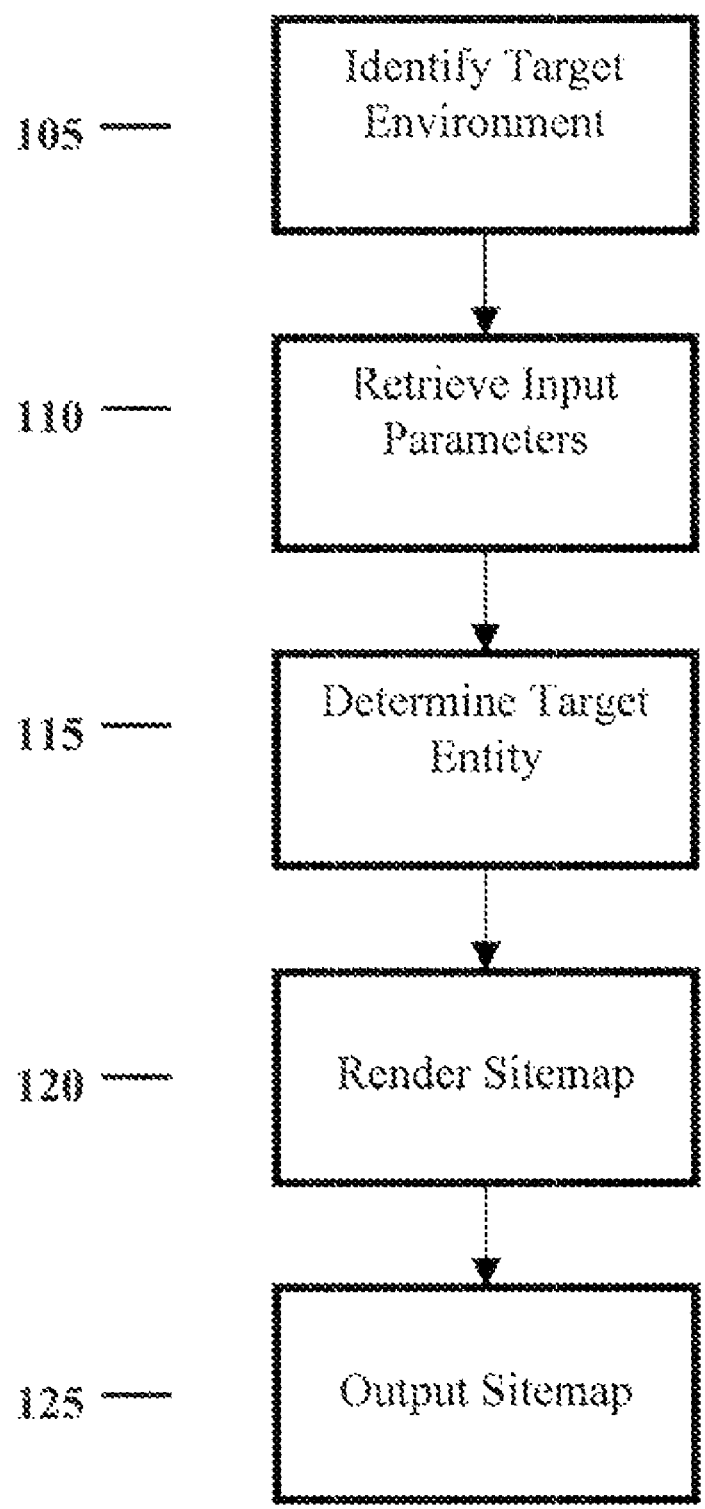
FIG. 1 illustrates one example of a flow diagram detailing aspects of a method for dynamically generating a search engine sitemap XML file.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. Aspects of the present invention are carried out within a computing system environment. The computer system as operated by a system user can embody a conventional personal computer system on which an application that is configured to accomplish the objectives of the present methodologies is operating. As is conventional, the computer system also includes other hardware and software elements that are conventionally included in personal computer systems.

Aspects of the present invention provide solutions for the dynamic generation of a sitemap XML file, wherein the solution particularly takes security, performance, and multi-stores environment into consideration. Further, the priority of each URL that is listed in a sitemap is dynamically evaluated within embodiments of the present invention.

Within aspects of the present invention a sample Sitemap JavaSever Page (JSP) will be provided for the dynamic generation the content of the Sitemap XML file. As such, the generated content consists of the URLs (in Sitemap XML format) that a merchant desires to index (e.g., the URLs for the catalog pages for an Internet retailer). A Sitemap generation command is provided to compile the JSP, and subsequently validate and save the Sitemap XML file in a predetermined location. The Sitemap generation command can be scheduled to run at regularly scheduled intervals (e.g. during an overnight time period that is based on a catalog update schedule).

Further, in order to avoid the consumption of CPU resources for the re-generation of the Sitemap XML in the event where a Sitemap generation command is scheduled to run but there is no catalog data or web pages being created or updated, web page caching will be implemented within embodiments of the present invention. The web page cache will be invalidated in the event that data or web pages are created/updated.

A key attribute of a Sitemap is that each listed URL is listed according to predetermined priority algorithms. This attribute is crucial for an Internet retailer who potentially may have thousands to millions of URLs that are available for a particular website. Thus, it is very important to the Internet retailer to have the capability to inform search engines as to which of their pages have been determined as being most important; allowing the search engines to order a crawl of the retailer's web pages in the way that best suits the retailer. Within aspects of the present invention, the capability to automatically evaluate the priority for each URL of a Sitemap is based on different criteria (e.g. promotional products or categories, inventory, analytics result, social book marking ((tagging)), etc.).

Dynamic Generation of a Sitemap

Within aspects of the present invention a Sitemap JSP is presented, wherein the Sitemap JSP commanded to be executed randomly or at a predetermined interval. In general, a Sitemap generation command is scheduled to generate a sitemap for each retail outlet/store that is associated with a website. As part of its operation, a Sitemap generation command collects information that is necessary for generating a sitemap (e.g., such as for which retail outlet/store a sitemap should be generated, and which sitemap JSP should be used for each retail outlet/store).

Further, the Sitemap generation command renders the Sitemap JSP. The Sitemap JSP in turns delegates a data bean for the retrieval of catalog data (e.g., category, product, item, package and bundle information). The data bean is designed to traverse very large catalog trees quickly and without significantly increasing the memory footprint. The Sitemap generation command further processes the rendered content. Particularly for the Sitemap protocol, when a website has many URLs to be indexed, the Sitemap protocol supports multiple sitemap files and the usage of an index file for the grouping of multiple sitemap files. Additionally, the Sitemap generation command is configured to separate a generated sitemap into segments and create a reference index file for the segmented sitemap file in the event that the rendered content is too large.

Turning now to the drawings in greater detail, it will be seen that in FIG. 1 shows a flow diagram detailing aspects of a method for dynamically generating a search engine sitemap XML file. At step 105 a target environment is identified (i.e., a particular retailer). At step 110 input parameter values in regard to the URLs that are desired to be listed on a sitemap are retrieved, wherein the input parameter values are determined by the target, environment, the input parameter values further comprising information identifying at least one target entity (e.g., the retailer's online web store) and information associating a predetermined sitemap definition page (Sitemap JSP) with the particular target entity.

At step 115, at least one target entity within a target environment for which a search engine sitemap definition page will be located is determined. The sitemap definition page for the determined target entity is rendered (step 120), wherein the rendered sitemap definition page is further configured to retrieve predetermined classification of data in order to create rendered content within the rendered sitemap definition page. The rendered content is further evaluated and ordered according to predetermined priority algorithms. At step 125, the rendered sitemap definition page for the determined target entity is output into a predetermined file format. Further, in the event that the output sitemap definition page is determined to exceed a predetermined size, then the output sitemap definition page is divided into smaller segments and an index file is generated and associated with the segmented output sitemap definition page files.

If a Sitemap generation command is scheduled to run but there is catalog data or sitemap pages being created or updated, the Sitemap generation command should not spend a lot of CPU resources to re-generate a Sitemap XML file. The first time a Sitemap JSP is compiled and executed, the page is cached. In the ease where there is no data change or no new product/category is created, the pages are not updated and there are no new product/category pages, then the Sitemap JSP will not be executed again during the next scheduled time interval, and the page cache will continue to be used. Within aspects of the present invention cache invalidation rules are set so that whenever the data (mainly catalog data) are updated or whenever new catalog data are created, the page cache will be invalidated.

Access Control

One possible threat to an online retail system is that an attacker can potentially consume a large amount of server CPU resources by submitting multiple requests to access a view of the JSP, which is used to generate the sitemap XML, because processing the Sitemap JSP consumes a significant amount of CPU resources. In the event where a Sitemap JSP is required to be accessed via a view command, access control to the Sitemap JSP will be applied to a Sitemap view wherein only an administrator will be able to access the view and run the JSP. The administrator can set a scheduler job to execute the command, which in turn compiles the Sitemap JSP with the administrator access, in a Business-to-business (B2B) operation, different sets of users can view a different subset of a catalog. The catalog seen by the guest may not be the same as that seen by the administrator. In this case, the generated catalog URLs for the sitemap (using the administrator access) will be the URLs that the search engine spiders (operating as guests) are able to crawl.

Multiple Target Entities

Within aspects of the present invention, the framework of the invention is flexible enough to generate sitemaps for multiple target entities (online stores). Each target entity can have its own Sitemap JSP file or they can share the same Sitemap JSP file. The Sitemap generation command will iteratively go through each of the stores specified by the user, using the JSP that is specific to the store to generate the corresponding sitemap. Instead of the administrator specifying each of the stores, the Sitemap generation command is also able to go through the stores based on store types (e.g. B2C or B2B). In this way, when there are a lot of stores, instead of specifying the stores one by one, users will be able to specify that sitemaps should be generated for all the Business-to-Consumer (B2C) stores. In a hosting scenario, multiple hosted target entities (online stores) tend to share similar characteristics and the same JSP assets can be used for these hosted stores. These stores might vary only in data, images (e.g. logo), and colors. In this case, multiple hosted stores can share the same Sitemap JSP.

Dynamic Evaluation of the Priority of a URL

An attribute in a sitemap is the prioritization of each URL that is listed within the sitemap. This attribute is especially important for large Internet retailers in order to allow a retailer to notify a search engine of which web pages were deemed, most important so that the search engine can order the crawl of the pages in the way that most benefits the retailers. URLs are automatically evaluated for priority based on differing business criteria, the business criteria comprising, but not being limited to:

Promotional products or categories: For example, products/categories displayed in the e-marketing spot (a spot to promote the retailer's hot products). A further example is that if the product supplier offers an incentive to the retailer on condition that their sales exceed a certain volume for the season, the priority of those product URLs might be higher.

Over-stocked: For example, if a specific product is over-stocked and the inventory exceeded a certain threshold, then the priority of the URL should be higher.

Low inventory: In the event that the inventory is low and is below a certain threshold the priority of the URL might be lower.

Analytics result: For example, for products with sales higher than a predetermined amount or with conversion rate higher than a predetermined percentage, then the priorities of those product URLs might be higher.

Product tagging (social book marking): For example, a system can look up the most popular items that are being tagged by their customers, wherein the priorities for those product URLs might be higher.

Each of the business criteria described above will have a corresponding (computer program) class to evaluate the value. The output value is normalized to be between 0 and 1, and then weighted to give a business user more flexibility in determining a final prioritization value. An algorithm is used to evaluate the priority based on the output value and the weight for each business criteria. For example, in the ease of inventory, the output value will be high if the product is over-stocked and the inventory exceeded a certain threshold. The more the inventory exceeds the threshold, the higher will be the output value.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for the generation of a sitemap definition page, the method comprising:

identifying a target environment, the target environment comprising a predetermined retailer;

retrieving input parameter values, wherein the input parameter values are determined by the target environment, the input parameter values further comprising information identifying at least one target entity, the target entity comprising an online retail store, and information associating a predetermined sitemap definition page with the particular target entity;

determining the at least one target entity within a target environment for which a search engine sitemap definition page will be located;

rendering the sitemap definition page for the determined target entity, wherein the rendered sitemap definition page is further configured to retrieve predetermined classification data in order to create rendered content within the rendered sitemap definition page, the rendered content being further evaluated and ordered according to predetermined priority algorithms, the sitemap being rendered according to a predetermined scheduled time interval;

outputting the rendered sitemap definition page for the determined target entity into a predetermined file format, where in the event that the output sitemap definition page is determined to exceed a predetermined size, then the output sitemap definition page will be divided into smaller segments and an index file will be generated and associated with the segmented output sitemap definition page files;

wherein the rendered content being further evaluated and ordered according to the predetermined priority algorithms comprises:
  providing a higher uniform resource locator priority for a promotional product in which a promotional product's supplier offers an incentive to the predetermined retailer;
  providing a higher uniform resource locator priority for over-stocked inventory that exceeds a certain threshold; and
  providing a higher uniform resource locator priority for low inventory in an event the low inventory is below a certain threshold.

2. The method of claim 1, further comprising the caching of the output sitemap definition page, wherein the cached output sitemap definition page is determined to be invalid in the event that it is determined that the predetermined classification data has been updated, further, in the event that the cached sitemap definition page is determined to be invalid the sitemap definition page is discarded and a new sitemap definition page comprising the updated predetermined classification data is generated and cached.

3. The method of claim 2, wherein a system administrator controls access to the rendering of the sitemap definition page.

4. The method of claim 3, wherein the predetermined sitemap definition page is associated with at least two target entities.

5. A computer program product that includes a non-transitory computer readable medium useable by a computer system, the medium having stored thereon a sequence of instructions which, when executed by the computer system, causes the computer system to generate a sitemap definition page by:
  identifying a target environment, the target environment comprising a predetermined retailer;
  retrieving input parameter values, wherein the input parameter values are determined by the target environment, the input parameter values further comprising information identifying at least one target entity, the target entity comprising an online retail store, and information associating a predetermined sitemap definition page with the particular target entity;
  determining the at least one target entity within a target environment for which a search engine sitemap will be located;
  rendering the sitemap definition page for the determined target entity, wherein the rendered sitemap definition page is further configured to retrieve predetermined classification of data in order to create rendered content within the rendered sitemap definition page, the rendered content being further evaluated and ordered according to predetermined priority algorithms, the sitemap being rendered according to a predetermined scheduled time interval;
  outputting the rendered sitemap definition page into a predetermined file format, where in the event that the output sitemap definition page is determined to exceed a predetermined size, then the output sitemap definition page will be divided into smaller segments and an index file will be generated and associated with the segmented output sitemap definition page files;
  wherein the rendered content being further evaluated and ordered according to the predetermined priority algorithms comprises:
    providing a higher uniform resource locator priority for a promotional product in which a promotional product's supplier offers an incentive to the predetermined retailer;
    providing a higher uniform resource locator priority for over-stocked inventory that exceeds a certain threshold; and
    providing a higher uniform resource locator priority for low inventory in an event the low inventory is below a certain threshold.

6. The computer program product of claim 5, further comprising the caching of the output sitemap definition page, wherein the cached output sitemap definition page is determined to be invalid in the event that it is determined that the predetermined classification data has been updated, further, in the event that the cached sitemap definition page is determined to be invalid the sitemap definition page is discarded and a new sitemap definition page comprising the updated predetermined classification data is generated and cached.

* * * * *